US006995905B2

(12) United States Patent
Wagner

(10) Patent No.: US 6,995,905 B2
(45) Date of Patent: Feb. 7, 2006

(54) SIGHTING TELESCOPE

(75) Inventor: Thomas Wagner, Wettenberg (DE)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 10/679,096

(22) Filed: Oct. 3, 2003

(65) Prior Publication Data
US 2004/0120036 A1 Jun. 24, 2004

(51) Int. Cl.
G02B 23/00 (2006.01)

(52) U.S. Cl. ........................................ 359/399; 359/422
(58) Field of Classification Search ................ 359/399, 359/422, 428, 424; 42/122, 126, 133, 135–139
See application file for complete search history.

(56) References Cited

U.S. PATENT DOCUMENTS

| 3,484,148 A | 12/1969 | Gotob | 350/8 |
|---|---|---|---|
| 3,962,795 A | 6/1976 | Ross | 42/122 |
| 4,200,355 A | 4/1980 | Williams, Jr. | 359/424 |
| 4,408,842 A | * 10/1983 | Gibson | 359/422 |
| 6,005,711 A | 12/1999 | Mai et al. | |
| 6,104,531 A | 8/2000 | Dross | |

FOREIGN PATENT DOCUMENTS

| DE | 35 01 321 C2 | 1/1985 |
|---|---|---|
| DE | 297 20 737 U1 | 2/1998 |

OTHER PUBLICATIONS

"Statement Regarding the Information Disclosure Statement Submitted Herewith", discussing why U.S. Patent 6, 104, 531 is not relevant to U.S. Appl. No. 10/679,096 submitted by the attorney of record for U.S. Appl. No. 10/679,096, filed Aug. 11, 2004.

* cited by examiner

Primary Examiner—Drew A. Dunn
Assistant Examiner—Joshua L Pritchett

(57) ABSTRACT

A sighting telescope has an inner tube that moves transversely of the telescope axis relative to an outer tube, and operating elements arranged mutually at an angle for transversely displacing the inner tube. In an embodiment of the invention, the outer tube has an enlarged internal diameter in the region of the operating elements. In a second embodiment of the invention, a leaf spring is arranged for producing a restoring force on the inner tube, extends in a substantially radial direction, and has radially offset support places, both on the outer tube and on the inner tube. The leaf spring is preferably arranged in the neighborhood of the enlarged internal diameter.

27 Claims, 2 Drawing Sheets

SIGHTING TELESCOPE

CROSS-REFERENCES TO RELATED APPLICATIONS

This is a continuation application of International Application PCT/EP02/03723 filed Apr. 4, 2002.

STATEMENT REGARDING FEDERALLY SPONSORED RESEARCH OR DEVELOPMENT

Not applicable.

BACKGROUND OF THE INVENTION

Sighting telescopes usually have an inner tube which is displaceable transversely of the telescope axis relative to an outer tube, and a lens or lens group which is displaceable in the direction of the telescope axis. The transverse displacement of the inner tube acts to displace a sighting mark for so called elevation adjustment, and the longitudinal displacement of the lens or lens group acts for so-called parallax compensation, i.e., for adjustment of the telescope for different target distances.

1. Technical Field

The adjustment devices for elevation adjustment are usually arranged about in the middle of the telescope, on so-called adjustment knobs; as a rule, two such adjustment knobs are present at an angle to one another, one for height adjustment and one for lateral adjustment of the sighting mark.

2. Prior Art

On ergonomic grounds, it is desirable to also arrange the operating device for parallax compensation in the neighborhood of, ideally in the same plane as, the operating elements for elevation adjustment. Such sighting telescopes are known from, for example, German Patent Document DE 297 20 737 or U.S. Pat. No. 6,005,711. In the telescope described in U.S. Pat. No. 6,005,711, a leaf spring is provided in the region of the adjustment knobs and extending substantially in the direction of the telescope axis, for producing a restoring force on the inner tube acting against the elevation adjustment.

It has now been found that in such sighting telescopes, because of the required firing stability and the resulting required wall thicknesses of the inner and outer tubes, the free aperture diameter for a sufficiently large visual field cannot be maintained if simultaneously an external diameter of the outer tube of one inch or less is to be maintained, particularly if the telescope is also to make different magnifications possible and if simultaneously the sighting marks are to have a square adjustment region.

SUMMARY OF THE INVENTION

The present invention therefore has as its object to make possible, in a sighting telescope with operating elements for both parallax compensation and elevation adjustment substantially in one plane, an outer diameter of the outer tube of a maximum of 25.4 mm. Here an at least approximately square adjustment region for elevation adjustment is also to be possible.

This object is attained with sighting telescopes with the following features:

A sighting telescope with an inner tube movable transversely of the telescope axis (A) relative to an outer tube, and operating elements arranged mutually at an angle for transversely displacing the inner tube, wherein one or more leaf springs are arranged between the outer tube and the inner tube for producing a restoring force on the inner tube, and wherein the leaf spring(s) extend(s) substantially in a radial direction.

The invention also includes the following features: A sighting telescope with an inner tube movable transversely of the telescope axis (A) relative to the outer tube, and operating elements arranged at an angle to one another for transversely displacing the inner tube, the outer tube having an enlarged internal diameter in the region of the operating elements.

According to an embodiment of the invention, one or more springs are provided between the outer and inner tubes, act to produce a restoring force on the inner tube for elevation adjustment, and are formed as one or more leaf springs which extend in a substantially radial direction. Sufficient space for a parallax compensation mechanism is thereby left seen in the radial direction of the telescope axis laterally of the leaf spring(s).

According to a second embodiment of the invention, the outer tube of the sighting telescope has, in the region of the adjusting elements, a short region in the direction of the telescope axis with an enlarged internal diameter. In order for sufficient mechanical stability to be nevertheless ensured, the outer diameter of the outer tube in this region, and thus in the immediate surroundings of the operating elements, is also greater than in the remaining regions, particularly in a respective region before and behind the plane of the operating elements which act to receive the sighting telescope on a rifle.

The enlargement of the internal diameter is not limited here to recesses for operating elements for elevation adjustment to pass through, but the distance of the outer tube from the mid-axis of the outer tube is, in the region with enlarged internal diameter, greater in all directions than in the regions before and after the plane of the operating elements for mounting the sighting telescope on the rifle.

Due to the enlarged internal diameter of the outer tube, it is possible to arrange the mechanism required for adjustment of the parallax compensation and for elevation adjustment between the inner tube and the outer tube, with an internal and external diameter of the inner tube required for a large visual field.

In the extreme case, the internal diameter of the outer tube may be larger than, or equal to, the outer diameter of the outer tube.

The spring or springs which act to produce a restoring force on the inner tube for elevation adjustment are preferably formed as one or more leaf springs which extend substantially in the radial direction and are arranged in the region between the outer tube and the inner tube in which the internal diameter of the outer tube is enlarged. Sufficient space thereby remains seen in the direction of the telescope axis laterally of the leaf spring(s) for the parallax compensating mechanism. In the extreme position of the elevation adjustment, with completely stressed spring, this dips completely into the enlargement region of the outer tube, so that the spring does not limit the adjustment range of the elevation adjustment.

The leaf spring(s) is/are to be supported at least three places, offset in the radial direction, on the outer tube and at least two places, offset in the radial direction, on the inner tube. The support places on the inner tube are then preferably arranged respectively opposite the operating elements for elevation adjustment and mutually offset by about 90° around the telescope axis. The support places of the leaf spring(s) on the inner tube are then situated about in the middle seen in the length direction of the leaf spring(s) between two support places on the outer tube. It can thereby be achieved that the directions of the restoring forces produced by the spring(s) are substantially antiparallel to the force directions of the forces exerted by the elevation adjustment operating elements on the inner tube.

In order to avoid dead places of the elevation adjustment, that is, positions of the inner tube in which the restoring force of the leaf spring(s) is not sufficient, the leaf spring(s) is/are preferably supported at a third place on the inner tube, situated about in the middle between the two other support places on the inner tube. This third support place for the leaf spring(s) on the inner tube is also situated about in the middle seen in the length direction of the leaf spring(s) between two support places on the outer tube. It is thereby achieved that the direction of the restoring force produced by the spring(s) and transmitted by this third support place to the inner tube is substantially antiparallel to the sum vector of the forces exerted on the inner tube by both operating elements for elevation adjustment.

The curvature of the leaf spring(s) at the various places is chosen so that the required directions of the forces exerted on the inner tube are attained.

The leaf spring, or each of the leaf springs, can be formed with an integral slit so that it has three, preferably four, free ends. However it is also possible to join together plural leaf spring segments to give a corresponding leaf spring. Likewise, two or three individual, thin leaf springs can be combined into a leaf spring packet.

Particularly, the leaf springs have the following structure:

a first spring segment with a central portion and two outer portions adjoining thereto on either side, the two outer portions being curved by the same amount and direction but curved oppositely in direction to the central portion, a second segment, extending to one side from the central portion and curved corresponding to the internal diameter of the outer tube, and a third segment running from the outer edge of the second segment in the direction toward the central portion of the first segment, and in the neighborhood of the place where it joins the second segment, curved in the same direction as the second segment but with greater curvature than the second segment, and thereafter curved in the opposite direction.

A thus shaped leaf spring can be arranged between the inner tube and the outer tube such that the whole second segment abuts on the outer tube and furthermore the two ends of the outer portion of the first segment and the end of the third segment are supported on the outer tube. The middle region of the outer portion of the first segment and the middle region of the third segment are then supported on the inner tube.

BRIEF DESCRIPTION OF THE DRAWINGS

The invention is described in detail hereinafter using the embodiment shown in the Figures.

DETAILED DESCRIPTION OF THE INVENTION

Figure 1:
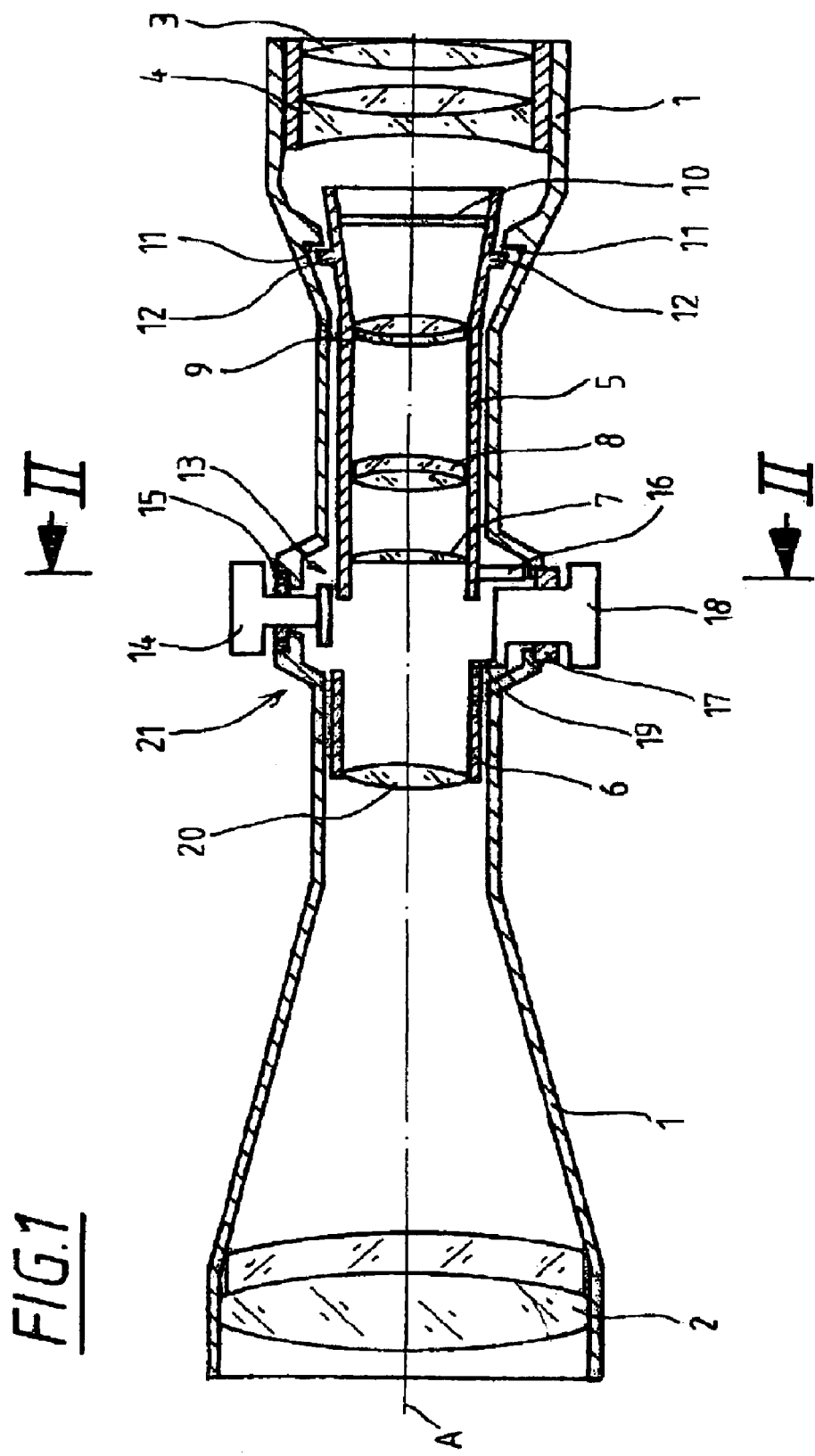
FIG. 1 shows a section through a sighting telescope according to the invention, in a plane containing the telescope axis.
Figure 2:
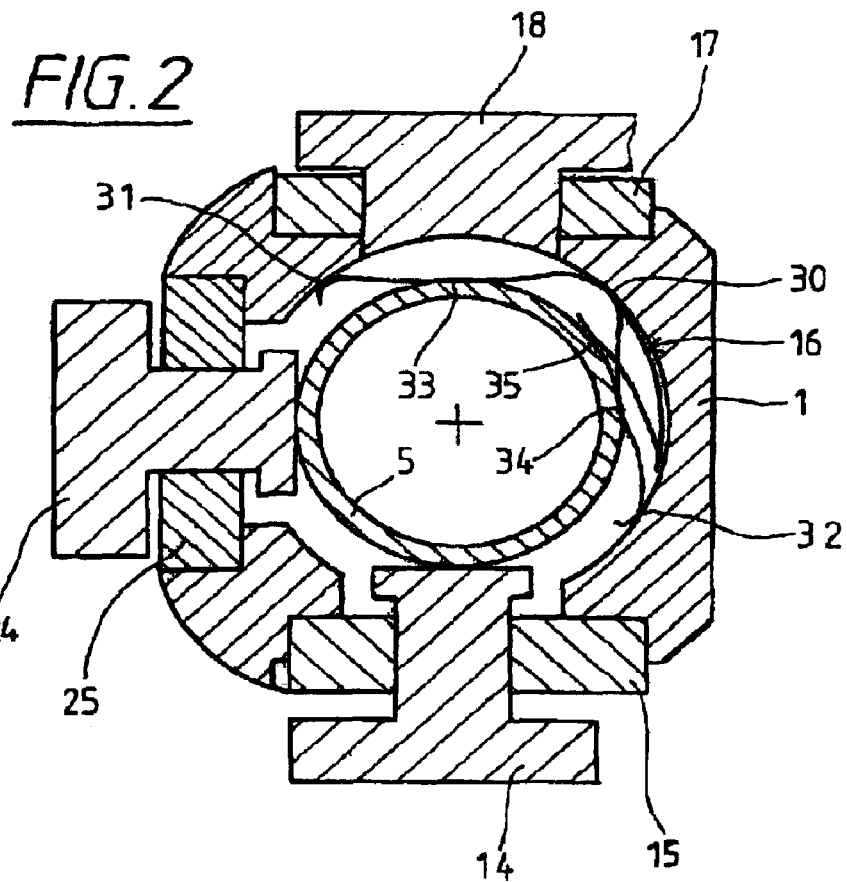
FIG. 2 shows a section through the sighting telescope of FIG. 1, in a plane perpendicular to FIG. 1.

The sighting telescope in FIGS. 1 and 2 has an outer tube (1) whose inner and outer diameter respectively increase toward the two ends. The objective (2) is arranged at the objective-side end of the sighting telescope and the two-lens eyepiece (3, 4) at the eyepiece-side end. The two components (3, 4) of the eyepiece are displaceable in the direction of the telescope axis by rotating the eyepiece portion, so that diopter compensation is possible.

A two-piece inner tube (5, 6) is arranged within the outer tube (1). The objective-side inner tube (6) is received, displaceable coaxially of the telescope axis (A), in the outer tube (1), and holds a focusing lens (20). Parallax compensation, i.e., setting sharply to different target distances, takes place by displacing the focusing lens (20) coaxially of the optical axis.

An operating knob (18) with an eccentric (19) is arranged in the outer tube (1) in a bearing washer (17), for displacing the objective-side inner tube (6). On rotating the operating knob (18), the eccentric (19) moves parallel to the telescope axis (A) and correspondingly entrains the objective-side inner tube.

A field lens (7), a two-lens reversing system (8, 9), and a reticle (10) are received in the eyepiece-side inner tube (5). The real intermediate image produced immediately on the objective side of the field lens (7) by the objective (2) together with the focusing lens (20) is imaged as a real image in the plane of the reticle (10) due to the reversing system (8, 9). The two lenses of the reversing system (8, 9) are oppositely displaceable in a known manner by means of an adjusting ring (not shown) on the eyepiece side, so that different magnifications between 4.5 times and 14 times can be set. The reversing system (8, 9) consequently forms a variator, which permits a magnification change by at least a factor of three.

The reticle (10) is displaceable perpendicularly of the telescope axis (A) for setting different elevations. For this purpose, the eyepiece-side inner tube (5) is tiltably or pivotably received in the outer tube (1). The outer tube has projections (11) for this purpose in the neighborhood of the reticle (10), but spaced apart from the reticle (10) in the direction of the telescope axis (A), and the inner tube has corresponding projections (12), so that tilting of the eyepiece-side inner tube (5) bearing the reticle is possible around the stop faces of the projections.

Two operating elements (14, 24), arranged mutually at 90°, are provided for elevation adjustment on the outer tube (1) at the height of the objective-side end of the eyepiece-side inner tube (5). Each of these operating elements (14, 24) substantially consists of a threaded spindle screwed in a nut (15, 25) on the outer tube (1) and having on its inner end a flange which presses against the eyepiece-side inner tube (5).

For latching the elevation setting, a spring tip (not shown) on the respective nut, and a respective toothing running around the threaded spindle and into which the spring tip engages, can be provided. When a scale is provided on the operating elements, it can also be possible to uncouple the operating elements (14, 24) from the associated threaded spindle.

The operating elements (14, 24) for elevation adjustment and the operating element (18) for parallax compensation are arranged, offset by about 90° around the telescope axis (A), about in a plane in the direction of the telescope axis (A).

A leaf spring (16) for producing a restoring force on the eyepiece-side inner tube (5) is arranged between the outer tube (1) and the eyepiece-side inner tube (5). So that on the one hand a sufficient space remains for movement of the eyepiece-side inner tube (5) radially of the telescope axis (A), with a simultaneously sufficiently large free diameter of the inner tube (5, 6), the outer tube (1) is formed thickened in the region (21) of the operating elements (14, 18, 24), and the internal diameter of the outer tube is enlarged in this region (13). The free diameter of the outer tube in this region (13) with widened internal diameter is about 98% of the external diameter of the outer tube (1) in the intermediate regions for mounting the sighting telescope.

The leaf spring (16) for producing the restoring force on the eyepiece-side inner tube against the force of the two operating elements (14, 24) for elevation adjustment extends substantially in a radial direction within the region (13) in which the internal diameter of the outer tube is enlarged. The leaf spring extends by more than 90° around the telescope axis (A), and is supported on the outer tube at least three radially offset places (30, 31, 32) and at three radially offset places (33, 34, 35) on the eyepiece-side inner tube (5). A respective one of the support places (33, 34) on the eyepiece-side inner tube (5) is then opposite a respective operating element (14, 24) for elevation adjustment, and the third support point (35) is situated in the bisector of the axes connecting the two other support points (33, 34) on the inner tube to the telescope axis (A).

Figure 3:
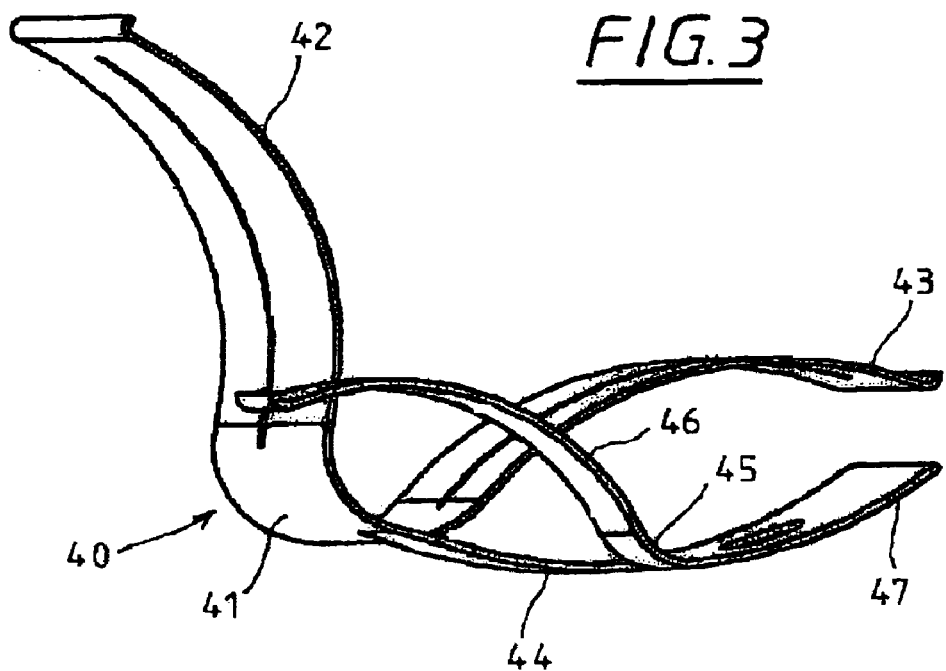
FIG. 3 shows a perspective view of a leaf spring for producing the restoring force for elevation adjustment.

The exact structure of the leaf spring (16) is shown in FIG. 3. The leaf spring (16) has a first spring segment (40) with a central portion (41) and two outer portions (42,43) adjoining thereto on either side, the two outer portions being alike curved by the same amount and direction, but curved less than, and oppositely in direction to, the central portion. Furthermore the leaf spring (16) has a second segment (44), extending from the central portion (41) to one side, and curved corresponding to the internal diameter of the outer tube, and a third segment (45, 46) running from the outer edge (47) of the second segment (44) in the direction of the central portion (41) of the first segment (40), and curved in a region (45) in the neighborhood of the junction to the second segment (44) in the same direction as the second segment but more strongly than the second segment (44), and thereafter curved in the opposite direction.

In the sighting telescope in FIGS. 1 and 2, the internal diameter of the outer tube (1) in the region (13) with widened diameter is 25 mm, and the external diameter of the inner tube (5) in this region is 20 mm. With a wall thickness of about 1.8 mm of the inner tube (5), even with a minimum external diameter of 25.4 mm of the outer tube (1) at the places provided for fitting to the rifle, there thus also remains a free diameter of the inner tube (5) which is sufficiently large that, with an objective diameter of 40 mm and with three-fold magnification, a visual field in the usual size of 10.36 m at 100 m, and with nine-fold magnification, a visual field of 3.35 m at 100 m, are achieved. With these measurements, the radius of curvature of the outer portions (42, 43) of the first segment (40) of the leaf spring is 10 mm, and the radius of curvature at the end of the third segment of the leaf spring, and thus in the region supported on the inner tube (5), is 7 mm.

What is claimed is:

1. A sighting telescope comprising:
    an outer tube,
    an inner tube movable transversely of a telescope axis (A) relative to the outer tube,
    operating elements arranged mutually at an angle for transversely displacing the inner tube, one or more leaf springs arranged between the outer tube and the inner tube that produces a restoring force on the inner tube, wherein the leaf spring extends or the leaf springs extend substantially in a radial direction, and
    wherein the outer tube comprises on enlarged internal diameter in a region of the operating elements, and
    wherein the outer tube comprises an enlarged internal diameter in a region of the operating elements,
    and wherein the internal diameter of the outer tube in the region with widened internal diameter comprises at least 95% of the minimum external diameter of the outer tube.

2. The sighting telescope according to claim 1, comprising one or more leaf springs arranged between the outer tube and the inner tube, in the region with enlarged internal diameter, for producing a restoring force on the inner tube.

3. The sighting telescope according to claim 2, wherein the leaf spring extends or the leaf springs extend substantially in a radial direction.

4. The sighting telescope according to claim 1, further comprising an optic displaceable in a direction of the telescope axis (A), and an adjustment device for displacing the optic arranged in or in the neighborhood of a plane of the operating elements for transversely displacing the inner tube.

5. The sighting telescope according to claim 1, wherein the leaf spring is or the leaf springs are supported at least three peripherally offset places on the outer tube.

6. The sighting telescope according to claim 5, wherein the leaf spring is or the leaf springs are supported at least two peripherally offset places on the inner tube.

7. The sighting telescope according to claim 6, wherein two of the support places of the leaf spring or the leaf springs on the inner tube are arranged respectively opposite one of the operating elements for transverse displacement of the inner tube.

8. The sighting telescope according to claim 7, wherein a third support place of the leaf spring or the leaf springs is situated on a bisector of the angle subtended by the two other support place of the leaf spring or the leaf springs on the inner tube and the telescope axis (A).

9. The sighting telescope according to claim 1, wherein the leaf spring or the leaf springs comprise three or four free ends.

10. Sighting telescope according to claim 1, wherein the leaf springs comprise the following structure:
    a first spring segment with a central portion and two outer portions adjoining thereto on either side, the outer portions being curved by the same amount and direction but curved oppositely in direction to the central portion,
    a second segment, extending to one side from the central portion and curved corresponding to the internal diameter of the outer tube, and
    a third segment running from an outer edge of the second segment in a direction toward the central portion of the first segment, and in the neighborhood of a place where it joins the second segment, curved in the same direction as the second segment but with greater curvature than the second segment, and thereafter curved in an opposite direction.

11. A sighting telescope comprising:
    an outer tube,
    an inner tube movable transversely of a telescope axis (A) relative to the outer tube, operating elements arranged mutually at an angle for transversely displacing the inner tube, one or more leaf springs arranged between the outer tube and the inner tube that produces a restoring force on the inner tube, wherein the leaf spring extends or the leaf springs extend substantially in a radial direction, and wherein the leaf spring is or the leaf springs are supported at least three peripherally offset places on the outer tube, and wherein the leaf spring is or the leaf springs are supported at least two peripherally offset places on the inner tube, and wherein two of the support places of the leaf spring or the leaf springs on the inner tube are arranged respectively opposite one of the operating elements for transverse displacement of the inner tube, and wherein a third support place of the leaf spring or the leaf springs is situated on a bisector of the angle subtended by the two other support places of the leaf spring or the leaf springs on the inner tube and the telescope axis (A).

12. The sighting telescope according to claim 11, wherein the outer tube comprises an enlarged internal diameter in a region of the operating elements.

13. The sighting telescope according to claim 11, comprising one or more leaf springs arranged between the outer tube and the inner tube, in the region with enlarged internal diameter, for producing a restoring force on the inner tube.

14. The sighting telescope according to claim 11, further comprising an optic displaceable in a direction of the telescope axis (A), and an adjustment device for displacing the optic arranged in or in the neighborhood of a plane of the operating elements for transversely displacing the inner tube.

15. The sighting telescope according to claim 11, wherein the internal diameter of the outer tube in the region with widened internal diameter comprises at least 95% of the minimum external diameter of the outer tube.

16. The sighting telescope according to claim 11, wherein the leaf spring or the leaf springs comprise three or four free ends.

17. Sighting telescope according to claim 11, wherein the leaf springs comprise the following structure:

a first spring segment with a central portion and two outer portions adjoining thereto on either side, the outer portions being curved by the same amount and direction but curved oppositely in direction to the central portion, a second segment, extending to one side from the central portion and curved corresponding to the internal diameter of the outer tube, and a third segment running from an outer edge of the second segment in a direction toward the central portion of the first segment, and in the neighborhood of a place where it joins the second segment, curved in the same direction as the second segment but with greater curvature than the second segment, and thereafter curved in an opposite direction.

18. A sighting telescope comprising:

an outer tub, an inner tube movable transversely of a telescope axis (A) relative to the outer tube, operating elements arranged mutually at in angle for transversely displacing the inner tube, one or more leaf springs arranged between the outer tube and the inner tube that produces a restoring force on the inner tube, wherein the leaf spring extends or the leaf springs extend substantially in a radial direction, and wherein the leaf springs comprise the following structure:

a first spring segment with a central portion and two portions adjoining thereto on either side, the outer portions being curved by the same amount and direction but curved oppositely in direction to the central portion, a second segment, extending to one side from the central portion and curved corresponding to the internal diameter of the outer tube, and a third segment running from an outer edge of the second segment in a direction toward the central portion of the first segment, and in the neighborhood of a place where it joins the second segment, curved in the same direction as the second segment but with greater curvature than the second segment, and thereafter curved in an opposite direction.

19. The sighting telescope according to claim 18, wherein the outer tube comprises an enlarged internal diameter in a region of the operating elements.

20. The sighting telescope according to claim 18, comprising one or more leaf springs arranged between the outer tube and the inner tube, in the region with enlarged internal diameter, for producing a restoring force on the inner tube.

21. The sighting telescope according to claim 18, further comprising an optic displaceable in a direction of the telescope axis (A),and an adjustment device for displacing the optic arranged in or in the neighborhood of a plane of the operating elements for transversely displacing the inner tube.

22. The sighting telescope according to claim 19, wherein the internal diameter of the outer tubs in the region with widened internal diameter comprises at least 95% of the minimum external diameter of the outer tube.

23. The sighting telescope according to claim 18, wherein the leaf spring is or the leaf springs are supported at least three peripherally offset places on the outer tube.

24. The sighting telescope according to claim 23, wherein the leaf spring is or the leaf springs are supported at least two peripherally offset places on the inner tube.

25. The sighting telescope according to claim 24, wherein two of the support places of the leaf spring or the leaf springs on the inner tube are arranged respectively opposite one of the operating elements for transverse displacement of the inner tube.

26. The sighting telescope according to claim 25, wherein a third support place of the leaf spring or the leaf springs is situated on a bisector of the angle subtended by the two other support places of the leaf spring or the leaf springs on the inner tube and the telescope axis (A).

27. The sighting telescope according to claim 18, wherein the leaf spring or the leaf springs comprise three or four free ends.

* * * * *

UNITED STATES PATENT AND TRADEMARK OFFICE
CERTIFICATE OF CORRECTION

PATENT NO. : 6,995,905 B2
APPLICATION NO. : 10/679096
DATED : February 7, 2006
INVENTOR(S) : Thomas Wagner It is certified that error appears in the above-identified patent and that said Letters Patent is hereby corrected as shown below:

<u>In column 6</u> :
Lines 7 and 8, delete: "wherein the outer tube comprises on enlarged internal diameter in a region of the operating elements, and".

Signed and Sealed this

Second Day of January, 2007

JON W. DUDAS
*Director of the United States Patent and Trademark Office*